Figure 1:
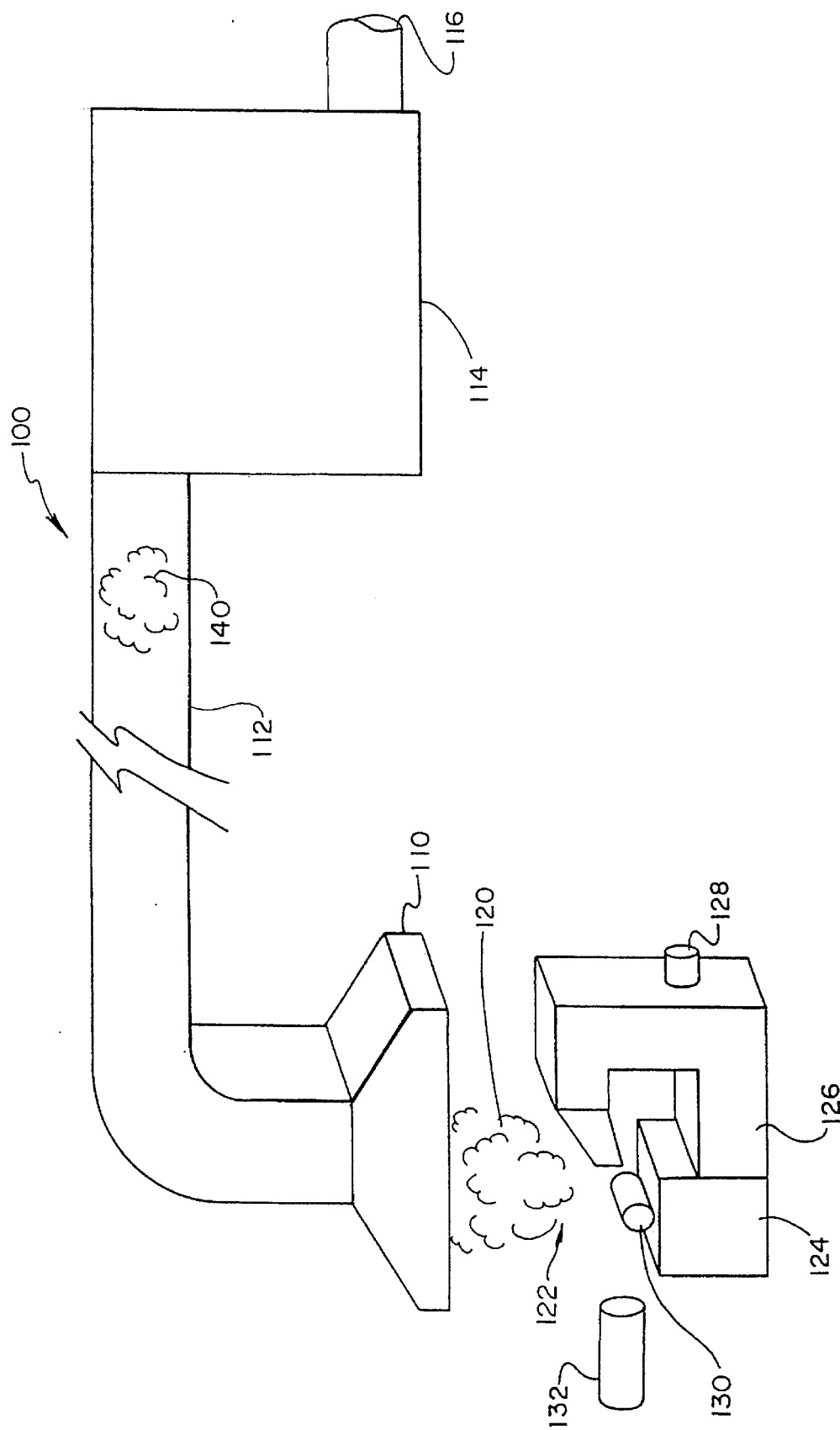

United States Patent [19]

Diachuk

[11] Patent Number: 5,622,538
[45] Date of Patent: Apr. 22, 1997

[54] SOURCE CAPTURE SYTEM FOR AN AIR CLEANING SYSTEM

[75] Inventor: Wolodymyr Diachuk, Golden Valley, Minn.

[73] Assignee: Helical Dynamics, Inc., Golden Valley, Minn.

[21] Appl. No.: 413,202

[22] Filed: Mar. 28, 1995

[51] Int. Cl.⁶ ................................................. B01D 45/04
[52] U.S. Cl. ........................ 55/383; 55/385.2; 55/418; 55/DIG. 18; 95/31; 95/273; 454/56; 454/66; 454/67
[58] Field of Search ................... 55/DIG. 18, 251, 55/418, 385.1, 385.2, 383; 454/49, 53, 56, 57, 58, 66, 67; 95/23, 31, 273

[56] References Cited

U.S. PATENT DOCUMENTS

| | | | |
|---|---|---|---|
| 1,676,969 | 7/1928 | Sutton et al. | 209/502 |
| 2,579,401 | 12/1951 | Schneible et al. | 454/66 |
| 2,593,702 | 4/1952 | Schneible | 454/66 |
| 2,924,062 | 2/1960 | Sutcliffe | 55/DIG. 18 |
| 3,340,788 | 9/1967 | Landingham et al. | 454/59 |
| 3,425,335 | 2/1969 | Black | 454/57 |
| 3,655,361 | 4/1972 | Brown et al. | 55/418 |
| 3,707,069 | 12/1972 | Pike | 55/418 |
| 3,786,739 | 1/1974 | Wright | 454/67 |
| 3,897,721 | 8/1975 | Fuhst | 55/418 |
| 4,023,473 | 5/1977 | Russell | 55/DIG. 18 |
| 4,038,056 | 7/1977 | Diachuk et al. | 55/238 |
| 4,050,368 | 9/1977 | Eakes | 454/57 |
| 4,125,062 | 11/1978 | Eakes | 454/56 |
| 4,160,407 | 7/1979 | Duym | 44/DIG. 18 |
| 4,216,003 | 8/1980 | Diachuk | 55/356 |
| 4,249,463 | 2/1981 | Hornby | 55/DIG. 18 |
| 4,255,169 | 3/1981 | Leliaert et al. | 55/DIG. 18 |
| 4,284,236 | 8/1981 | Bradshaw | 236/49.3 |
| 4,350,504 | 9/1982 | Diachuk | 422/105 |
| 4,364,754 | 12/1982 | Diachuk | 55/269 |
| 4,382,807 | 5/1983 | Diachuk | 55/269 |
| 4,460,386 | 7/1984 | Diachuk | 95/220 |
| 4,623,022 | 11/1986 | Chakrabarty et al. | 166/310 |
| 4,741,257 | 5/1988 | Wiggin et al. | 454/56 |
| 4,902,315 | 2/1990 | Spicer | 95/273 |
| 5,023,116 | 6/1991 | Williams | 427/424 |
| 5,024,681 | 6/1991 | Chang | 95/70 |
| 5,110,331 | 5/1992 | Williams | 55/302 |
| 5,120,335 | 6/1992 | Gorlich et al. | 219/121.5 |
| 5,129,930 | 7/1992 | Gauthier et al. | 55/394 |
| 5,133,246 | 7/1992 | Campbell | 454/52 |
| 5,133,690 | 7/1992 | Bowe | 454/51 |
| 5,178,656 | 1/1993 | Gauthier et al. | 55/450 |

OTHER PUBLICATIONS

Professor William C. Heinz, *Aerosol Technology, Property, Behavior and Measurement of Airborne Particles,,* "The mechanics of clouds are more complicated than that for individual particles, and a complete description does not exist." (Chapter 17, p. 347).

Helical Dynamics Brochure "Heli–Flo System Plenu–Flo Duct System" Dated Jun. 15, 1991.

*Primary Examiner*—Jay H. Woo
*Assistant Examiner*—Duane S. Smith
*Attorney, Agent, or Firm*—Patterson & Keough, P.A.

[57] ABSTRACT

A source capture system for capturing contaminated air from an industrial process includes structure both for continuously capturing a contaminated air volume emitted during operation of the industrial process and for mixing that contaminated air volume with an ambient air volume to produce a mixed air volume which is then transferred to an air clean apparatus or the like. The source capture system recognizes that air volumes will exhibit different characteristics traveling through an air treatment system, and that certain of those characteristics such as cloud-like formation and contaminated air volumes having significant gaseous phase vapor components are undesirable and operate to decrease the overall effectiveness of the air treatment system, regardless of what type of technology is used for the air cleaning apparatus. Accordingly, the source capture system is designed in such a way as to reduce the occurrence of cloud-like formations and increase the condensation of mist/vapor components of the air volume presented to air cleaning apparatus.

32 Claims, 8 Drawing Sheets

SOURCE CAPTURE SYTEM FOR AN AIR CLEANING SYSTEM

RELATED APPLICATIONS

The present invention is related to two co-pending applications in the United States Patent and Trademark Office, the first of which is filed concurrently herewith and entitled "AIR CLEANING SYSTEM FOR MECHANICAL INDUSTRIAL PROCESSES", application Ser. No. 08/413,874, and the second of which was filed on Mar. 23, 1995, entitled, "MODULAR AIR CLEANING SYSTEM", application Ser. No. 08/409,828, both of which are assigned to the assignee of the present invention, and the disclosure of each of which is incorporated by reference herein.

BACKGROUND OF THE INVENTION

1. Field of the Invention

The present invention relates generally to air cleaning systems for treating contaminated air or emissions, and more particularly, to a source capture system for an air cleaning system that captures contaminated air from an industrial process or the like.

2. Description of Related Art

In the field of industrial processes, and particularly mechanical industrial processes such as machining, metal working, material fabrication and the like, it is well known to use some type of contaminated air cleaning system to capture and treat the contaminated air and other emissions produced by these industrial process. During operation of these types of industrial processes, contaminated air containing mist, vapor, and smoke is produced, particularly whenever liquid coolants are used on, or near, the working surface of the operation. In a cutting or grinding operation, for example, liquid coolant is evaporated and thrown by the cutter or grinder into the air space surrounding the work area. Although large coolant droplets and chips of material may fall to the ground, small coolant droplets, mist and vapor and very small pieces of material and dust become suspended in the air space surrounding the work area to form a thick haze of contaminated air. In order to capture this contaminated air for purposes of removal and treatment, some type of source capture system is located near the work area.

Two of the most widely used source capture systems are hood arrangements and containment units. In a hood arrangement, such as shown in U.S. Pat. Nos. 1,676,969, 3,340,788, 3,425,335, 4,284,236 and 4,623,022, a hood having a relatively large opening is placed above or adjacent to the work area of the industrial process and a negative pressure is used to draw the air immediately around the work area into the opening of the hood. In a containment unit, such as shown in U.S. Pat. Nos. 4,902,315, 5,023,116, 5,133,246 and 5,133,690, an entire enclosure that is substantially air-tight is built around the industrial process and the contaminated air and emissions are then withdrawn from the containment unit, usually through duct work connected to an opening in the top of the containment unit, often with makeup air being introduced into the enclosure.

Many early systems simply vented the contaminated air and other emissions captured from an industrial process directly to the outside. With the advent of air pollution regulations, source capture systems were connected to air cleaning apparatus in an effort to remove harmful contaminates from the air stream prior to venting it to the outside. Over the years, many different types of air cleaning apparatus have been used in an effort to clean up the contaminated air and other emissions from industrial processes. Typically, contaminated air would be captured at multiple locations or work areas within a factory, for example, and then routed by ventilation duct work to a common air cleaning apparatus, often located outside the factory. A variety of different air cleaning and/or mist removal apparatus, such as helical separators, cyclone separators, scrubbers, mechanical and electrical filters and the like, have been used to clean the contaminated air once it is within the air treatment system. Examples of these type of apparatus are shown in U.S. Pat. Nos. 4,038,056, 4,216,003, 4,364,754, 4,382,807, 4,460,386, 4,350,504, 5,024,681, 5,110,331, 5,120,335, 5,129,930 and 5,178,656, as well as the Heli-Flow® system manufactured by the assignee of the present invention, the Monsanto Organic Package System manufactured by Monsanto Enviro-Chem Systems, Inc., St. Louis, Mo. and the Duct Type Mist Separator KNA manufactured by Delbag Luftfilter, Germany. The basic source capture systems that bring the contaminated air to these air cleaning apparatus, however, have not changed.

One approach to modifying existing hood-type source capture systems is described in U.S. Pat. Nos. 4,050,368 and 4,125,062 issued to Eakes. In both of these patents, a portion of the exhaust air captured by the hood arrangement is recirculated through the air space above the work area prior to being treated by some type of air cleaning apparatus so that the volume of air per unit time passing through the air cleaning apparatus is reduced. In a preferred embodiment, the hood arrangement has an air current at the front of the work area to further direct the contaminated air into the source capture system. This approach can decrease the amount of makeup air which would otherwise be drawn from the environment surrounding the work area, but it does not otherwise change the fundamental manner in which the contaminated air is drawn into the air treatment system.

While an increasing amount of effort has been focused on improving the effectiveness of air cleaning apparatus for air treatment systems, the basic source capture systems that bring the contaminated air into these air treatment system have not changed. One reason why there has been so little effort focused on improving source capture systems is because of a general assumption about the way in which air moves within the air treatment system. Because contaminated air is captured at a location far removed from the air cleaning apparatus there is an assumption that the manner in which the air is captured will not have a significant effect on the ability of the air cleaning apparatus to properly clean the contaminated air. As will be shown, however, there are many situations in which this assumption does not hold true. Consequently, it would be desirable to provide for a source capture system which takes into account the manner in which air moves within the overall air treatment system so as to increase the effectiveness of the air cleaning apparatus connected to the source capture system.

SUMMARY OF THE INVENTION

A source capture system according to the present invention captures contaminated air from an industrial process that contains a heterogenous multi-component mixed density fluid (e.g., mist, vapor and/or smoke). The source capture system includes structure both for continuously capturing a contaminated air volume emitted during operation of the industrial process and for mixing that contaminated air volume with an ambient air volume to produce a mixed air volume that is then transferred to an air cleaning apparatus or the like. The present invention recognizes that air volumes will exhibit different characteristics traveling through an air treatment system, and that certain of those characteristics such as cloud-like formation and contaminated air volumes having significant gaseous phase vapor components are undesirable and operate to decrease the overall effectiveness of the air treatment system, regardless of what type of technology is used for the air cleaning apparatus. Accordingly, the source capture system of the present invention is designed in such a way as to reduce the occurrence of cloud-like formations and increase the condensation of gaseous phase vapor components of the air volume presented to air cleaning apparatus.

Unlike existing source capture systems, embodiments of the present invention recognizes that contaminated air volumes may contain a heterogenous multi-component mixed density fluid (e.g., mist, vapor and/or smoke), which tends to coalesce into a cloud-like formation that exhibits aerosol bulk motion characteristics. Without structure for mixing the contaminated air volume with an ambient air volume, as is provided for according to the present invention, existing source capture systems capture these cloud-like formations en mass. Once the cloud-like formation has entered the source capture system and duct work, it will tend to remain in a cloud-like state as it passes through the source capture system to the air treatment system. Because existing air cleaning apparatus are designed to remove non-gaseous phase contaminants from an air volume on a particulate level, and not on a macro cloud-like level, the efficiency of the air treatment systems is necessarily decreased. By mixing the contaminated air volume with the ambient air volume to produce a mixed air volume that is supplied to the air treatment system, embodiments of the present invention avoid these problems. In addition, the overall energy of the mixed air volume, as measured by temperature and vapor pressure, is reduced as compared to the contaminated air volume, thereby increasing the opportunity for condensation of additional contaminants contained within the contaminated air volume into gaseous phase vapor components such that they may be removed by the air cleaning apparatus as a condensed mist.

When existing source capture systems capture a cloud-like formation within the system, the cloud-like formation remains intact all the way to the air treatment system, and sometimes even through the air cleaning apparatus. This is because the vast majority of the energy internal to the cloud formation is simply unavailable to forces acting around its exterior. To counteract this problem, embodiments according to the present invention utilize a structure for mechanically mixing the contaminated air volume with an ambient air volume so as to prevent the source capture system from capturing cloud-like formations en mass.

According to a preferred embodiment, the structure for mixing the contaminated air volume with the ambient air volume is comprised of one or more static openings, each of which has at least one opening dimension that is small enough to prevent a bulk motion cloud-like aerosol from passing through the opening intact at a given mixing velocity. For most efficient operation, the mixing velocities are between about 2.5 and 25.0 cubic meters per second and the static opening has at least one dimension that is smaller than about 2.5 centimeters. For a hood arrangement type of source capture system, these velocities and dimensions result in the mixing of ambient air from the environment surrounding the industrial process and the contaminated air volume from the industrial process as both air volumes pass through the static openings. For a containment-type source capture system, the ambient air may be provided either through openings in the bottom of the containment unit below the industrial process, or by separate ambient air openings which are located adjacent the mixing structure defining the static openings.

The combination of the ambient air volume with the contaminated air volume will achieve a decrease in both temperature and pressure of the mixed air volume that results. Normally, a combination of ambient air volume and mixing velocity is chosen such that the temperature of the mixed air volume is not more than 5° centigrade above the temperature of the ambient air volume.

In addition, embodiments of the present invention also provide a method for sizing a source capture system prior to installation and operation of the industrial process. The method involves a determination of the maximum dissipated heat energy of the industrial process based upon a horsepower output of any motors used by the process, and a determination of the characteristics and maximum coolant pressure of any liquid coolant and the maximum terminal velocity of the ambient air surrounding the source capture system if the source capture system is at least partially open to ambient air. Using these factors, a minimum air flow velocity of air entering the source capture system is established. This minimum air flow velocity is then used to determine an effective cross-sectional size of the opening of the source capture system based upon a given air velocity volume within the source capture system. By utilizing this method with a preferred embodiment of the structure for the source capture system, it is possible to optimize the size of the openings in the source capture system.

BRIEF DESCRIPTION OF THE DRAWINGS

FIG. 1 is an overall block diagram of an existing air cleaning system, including a prior art hood arrangement-type source capture system.

FIG. 2 is an overall block diagram of an air cleaning system including a source capture system in accordance with the present invention.

FIG. 3 is an overall cross-sectional schematic diagram of a hood arrangement according to an embodiment of the present invention.

FIG. 4 is an overall perspective view of a non-air-tight container unit according to an embodiment of the present invention.

FIG. 5 is an overall cross-sectional schematic diagram of an air-tight containment unit according to an embodiment of the present invention.

FIG. 6 is an overall perspective schematic view of a retrofit plenum according to an embodiment of the present invention.

FIG. 7 is a plan view of a preferred embodiment of the mixing structure of the source capture system shown in FIG. 3.

FIG. 8 is a detailed cross-sectional view of a preferred embodiment of the source capture system shown in FIG. 5.

DETAILED DESCRIPTION OF PREFERRED EMBODIMENTS

Referring now to FIG. 1, an overall block diagram of an existing air cleaning system will be described. In an existing air cleaning system 100 for use in a mechanical industrial process, such as machining, metal working, or material fabrication or the like, a source capture system, such as a hood 110, is connected by a conduit structure 112 to a mist/particulate removal apparatus 114 and provided with a fan and duct 116 to draw contaminated air 120 through air cleaning system 100. Contaminated air 120 is produced at a source 122 within a work area 124 associated with hood 110. In a typical mechanical industrial process, work area 124 would include a material working machine 126 having a motor 128 which provides motive power for the operation of material working machine 126. A work piece 130 located at source 122 and work area 124 is the object of the particular material working process being performed by material working machine 126. During this process it is typical that a coolant transfer device 132 would spray coolant on work piece 130, both for purposes of cooling as well as lubrication during the material working process.

It is contemplated that numerous types of material working machines 126 and work pieces 130 are included within the intended scope of the present invention. Examples of the material working process contemplated by the present invention include drilling, grinding, cutting, sawing, sanding, chipping, forming, planing, joining, and the like. Examples of work pieces 130 which may be the subject of this process include metals, woods, plastics, ceramics, cloth, and the like. While the primary application of the air cleaning system of the present invention is directed to mechanical industrial processes and material work pieces of the type described, it will be recognized that the air cleaning system of the present invention is equally applicable to handling other types of contaminated air streams generated by different processes and work products, particularly when such processes result in contaminated air streams have both a vapor and particulate (i.e., smoke and/or mist) component that exhibit cloud-like behavior.

The problem with existing air cleaning system 100 is that contaminated air generated 120 by the mechanical industrial process at source 122 tends to form a localized cloud of contaminated air directly above source 122. As the structure of hood 110 is designed to provide an opening having a periphery surrounding the periphery of work area 124, the cloud formation of contaminated air 120 is drawn, in its entirety, within hood 110 and into conduit structure 112. Normally, clouds having a diameter on the order of less than ten meters, for example, are generally presumed to be unstable and are assumed to break up and deteriorate rather quickly. Unfortunately, and quite unexpectedly, this general assumption does not hold true when processing contaminated air streams from mechanical industrial processes, for several reasons. First, the makeup and characteristics of the contaminated air cloud 120 are significantly more cohesive than, for example, a naturally-occurring cloud of similar dimensions. This is particularly due to the heat generated by motor 128 and the nature and quality of the liquid coolant used in the mechanical industrial process. Second, the contaminated air cloud 120, once within hood 110 and conduit structure 112, tends to remain intact because there are relatively fewer forces that can significantly act upon the cloud formation within the conduit structure 112, for example, than if a similar cloud formation were in the ambient air. Finally, the nature of cloud formations themselves are such that the behavior of cloud formation is difficult to predict even in the relatively confined situation of an air cleaning system. As Professor William C. Heinz indicates in his book, *Aerosol Technology, Property, Behavior and Measurement of Airborne Particles* "The mechanics of clouds are more complicated than that for individual particles, and a complete description does not exist." (Chapter 17, p. 347).

In contrast to air cleaning systems 100 in the prior art, embodiments of the present invention recognize that because a cloud contains its own energy and because that energy is generally inaccessible to the air stream, particularly in the situation when the cloud formation is within a conduit structure, an air cleaning system must include a mechanism to prevent such cloud formations from operating within the air cleaning system. Preferably, the prevention of cloud formations is accomplished at the point at which the contaminated air enters the air cleaning system. Alternatively, mechanisms can be constructed within the air cleaning system to break up any cloud formations that have entered the conduit structure of an air cleaning system.

To accomplish this objective, embodiments of the present invention, in stark contrast to the generally accepted theory for air cleaning systems, actually add an ambient air volume to the contaminated air volume to increase the total air volume that must be processed by the air cleaning system. The ambient air volume is mixed with the contaminated air volume so as to produce a mixed air volume, and the mixed air volume is generally prevented from exhibiting cloud-like aerosol bulk motion characteristics.

Figure 2:
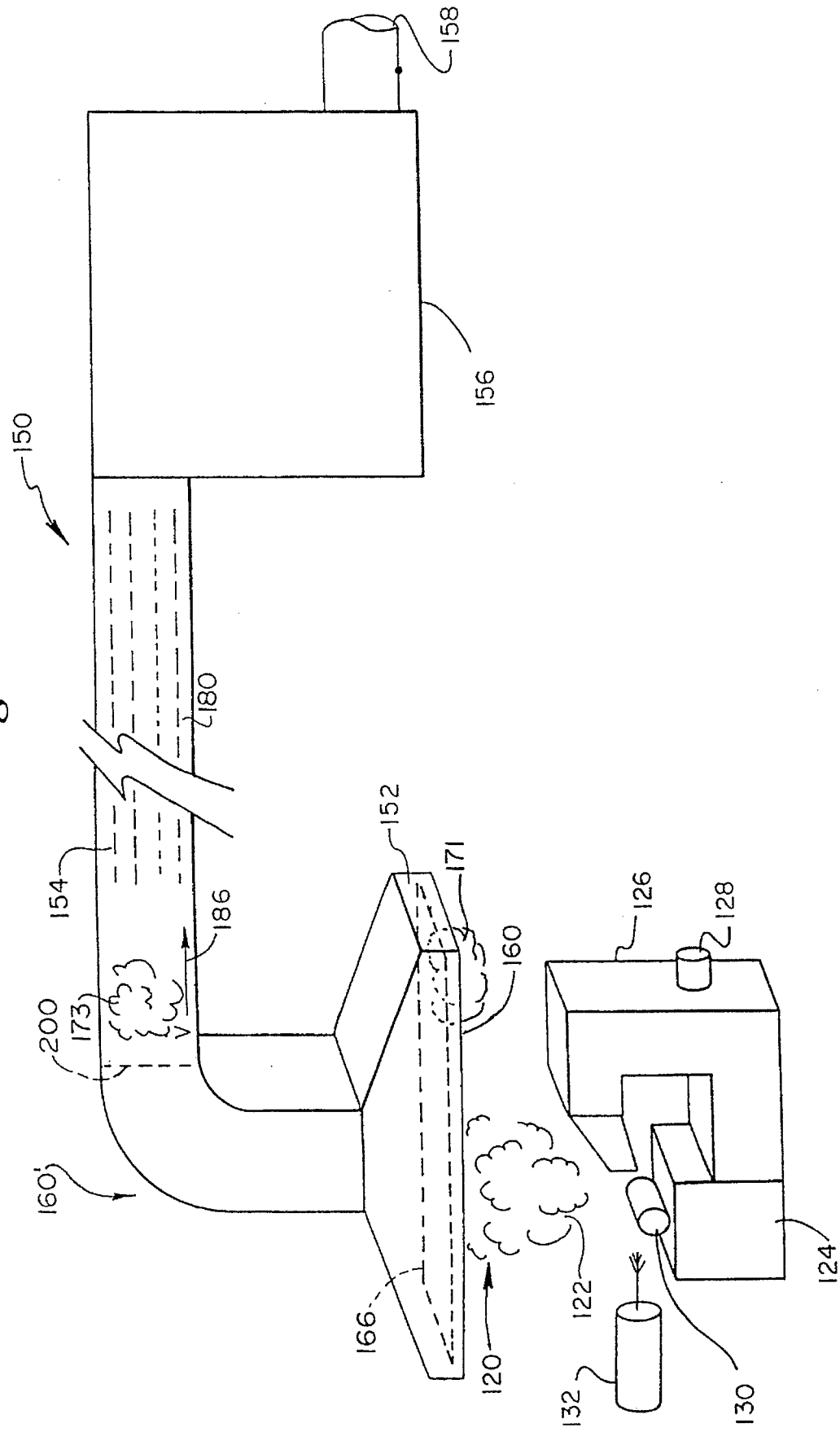
Figure 3:
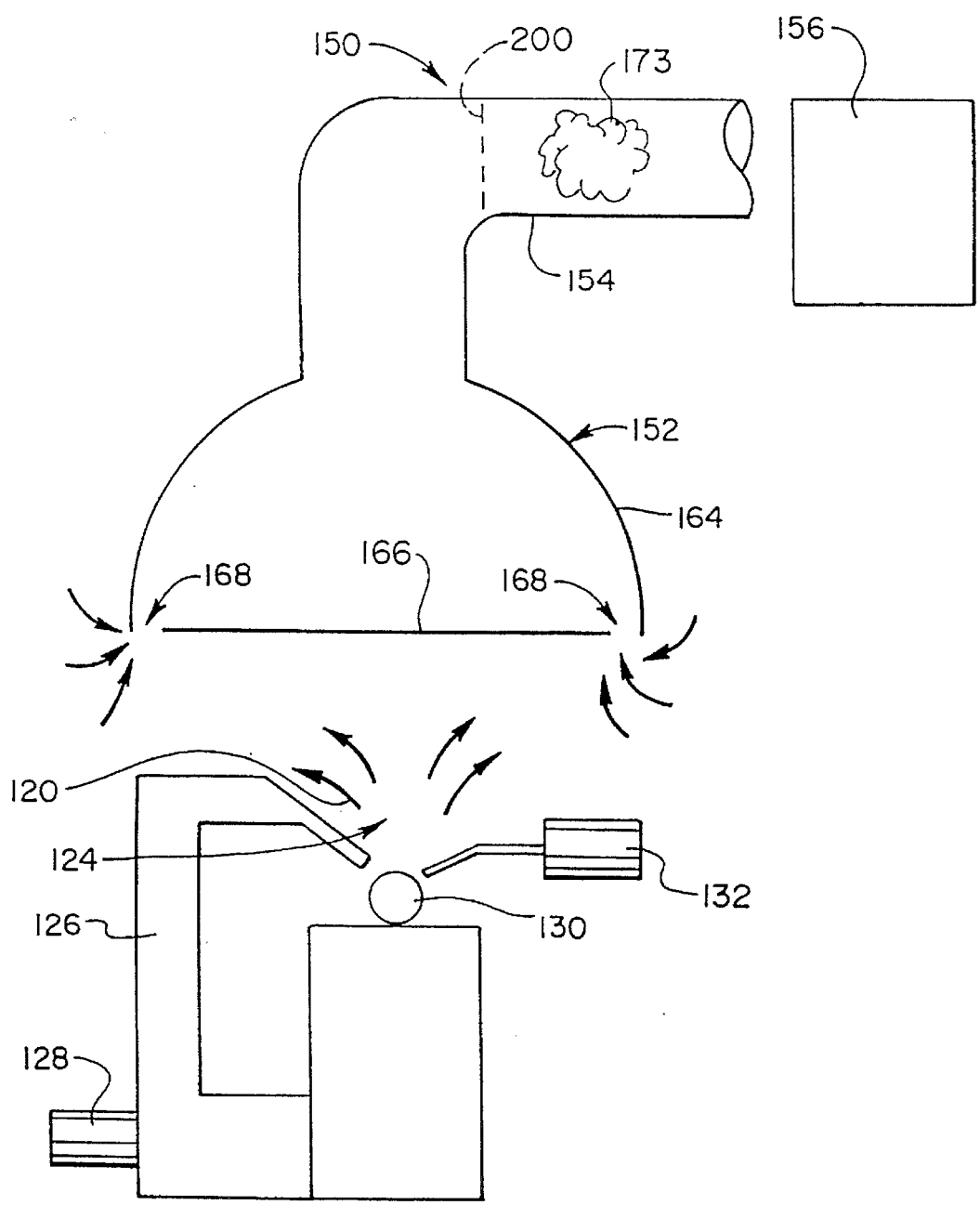
Figure 7:
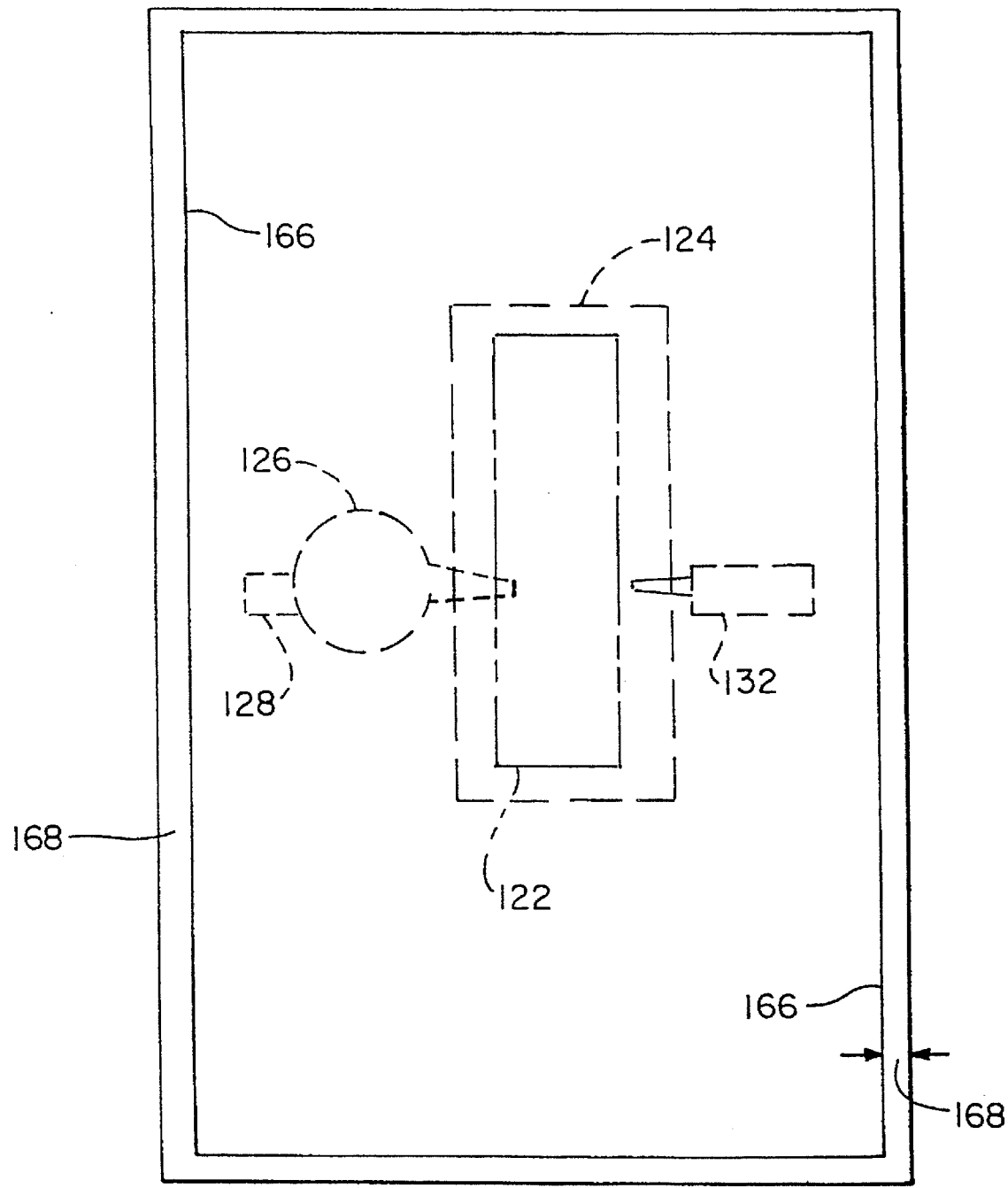

Referring now to FIGS. 2 and 7, a preferred embodiment of the present invention will be described. As with FIG. 1, a mechanical industrial process generates a contaminated air volume 120 using a material working machine 126 having a motor 128 and a work area 124 with a work piece 130, to form a source 122 of contaminated air volume 120. Coolant source 132 typically supplies coolant during the mechanical industrial process. Air cleaning system 150 in accordance with the present invention includes a source capture system 152, a conduit structure 154, a mist/particulate removal apparatus 156, an air movement mechanism including duct 158, and a mixing mechanism 160 and/or 160'. Unlike hood 110 in the prior art, source capture system 152 also is provided with mechanical mixing structure 160 for mixing the contaminated air 120 with an ambient air volume 171 at the intake to source capture system 152. Alternatively, conduit structure 154 may be provided with an in-line mixing structure 160', which provides an additional intake of an ambient air volume 173. The mixing of an ambient air volume with a contaminated air volume by mixing mechanism 160 and/or 160' is controlled so that the ratio of the ambient air volume to the contaminated air volume is selected and controlled to within a range of 5:1 and 100:1, and preferably within a range of 10:1 and 25:1.

Referring to FIG. 3, the air cleaning system 150 is depicted suspended above the work area 124 that is defined for the work piece 130. Mechanical industrial operations are being performed on the work piece 130 by the material working machine 126, which is powered by a motor 128. Coolant source 132 sprays coolant on the work piece 130 during the mechanical operations. The coolant 132 may comprise, for example, a substantial water component, biocides, a lubricator that may or may not contain an oil component, and/or a rust inhibitor.

Air cleaning system 150 includes the source capture system 152, a conduit structure 154, a mist/particulate separator 156, and a fan with duct 158. The source capture system 152 is comprised of a hood 164, a central baffle 166, and a peripheral capture slot 168. The lower margins of the hood 164 extend substantially outward from a location over the work piece 130 in order to capture virtually all of the contaminated air volume 120 that is generated in the work area 124.

Central baffle 166 is relatively large and is disposed within the hood 164 approximate the lower margin thereof.

Central baffle 166 preferably is formed of a solid sheet of metal to present a substantially impervious surface to the contaminated air volume 120.

Peripheral capture slot 168 is defined between the outer margin of the central baffle 166 and the lower margin of the hood 164. In a preferred embodiment, the capture slot 168 has a width dimension that is between 1 and 2.5 centimeters.

Alternatively, the ambient air is mixed with the contaminated air volume 120 by being admitted to mechanical mixing structure 160', which includes an ambient air intake. It is important that mixing of ambient air with the contaminated air volume 120 occur as close as possible to the work area 124. Accordingly, the ambient air intake is located proximate to source capture system 152.

Figure 4:
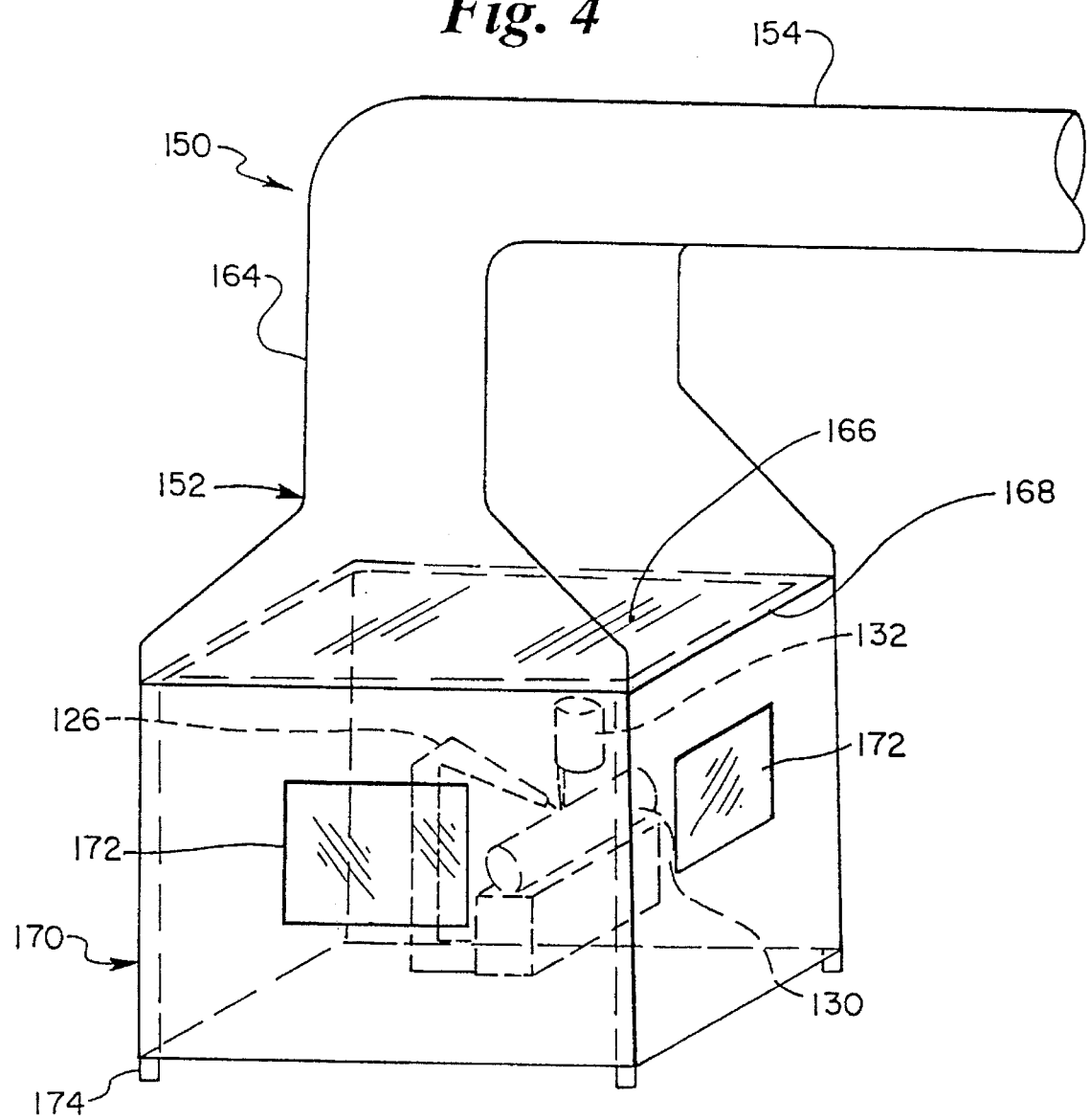

Certain mechanical industrial operations are conducted within an enclosure. Referring to FIG. 4, the source capture system 152 of the present invention is utilized with a work station enclosure 170. The work station enclosure 170 is generally rectangular in shape and substantially encloses the work piece 130, the material working machine 126, and the coolant source 132. Work station enclosure 170 in FIG. 4 may be termed a leaky enclosure in that openings 172 are defined in the sides thereof. The openings 172 are generally used to view the mechanical industrial operation and may also be used to position the work piece 130 in place.

Additionally, the work station enclosure 170 is mounted on legs 174. Such mounting defines an opening between the bottom margin of the work station enclosure 170 and the air flow of the factory or other surrounding location.

Hood 164 of the source capture system 152 is substantially co-extensive with the top margin of the work station enclosure 170. Central baffle 166 is suspended within the hood 164 and is preferably coplanar with the top margin of the work station enclosure 170. Peripheral capture slot 168 is defined between the margin of the central baffle 166 and the lower margin of the hood 164.

The source capture system 152 is fluidly coupled to conduit structure 154. The conduit structure 154 is in turn fluidly coupled to a mist/particulate separator and fan unit (not shown), as previously described.

Figure 5:
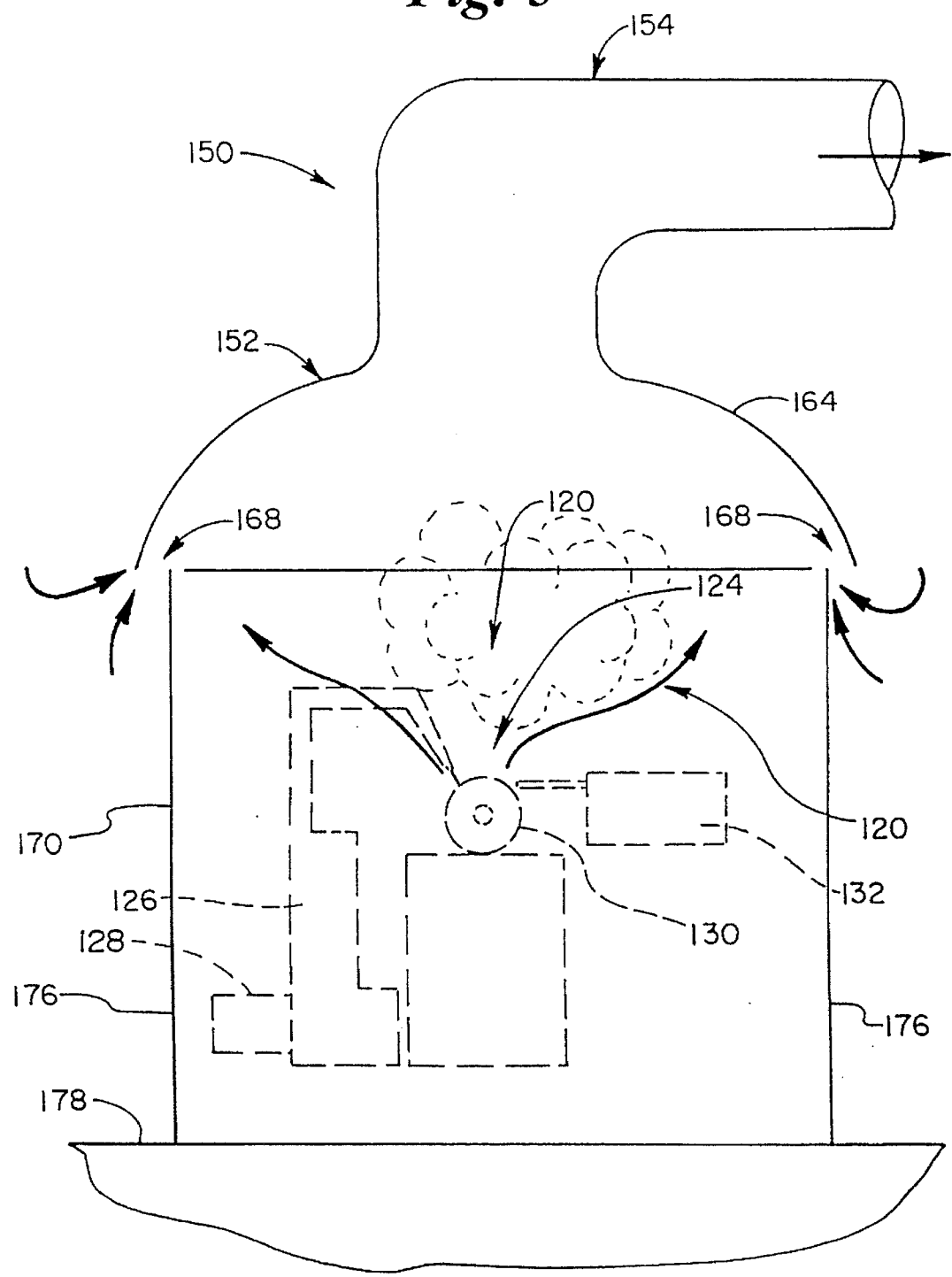

Referring now to FIG. 5, the air cleaning system 150 is depicted utilized with a work station enclosure 170 that can be described as a being a tight enclosure as distinct from the leaky work station enclosure 170 of FIG. 4. The tight work station enclosure 170 is substantially sealed. Accordingly, the walls 176 of the work station enclosure 170 adjoin the factory floor 178 and all openings 172, such as described in reference to FIG. 4, are included. Any such opening providing either viewing or access is sealed and may have a transparent panel to facilitate viewing.

In the embodiment depicted in FIG. 5, the lower margin of hood 164 of the source capture system 152 resides outside the upper margin of the work station enclosure 170. The margin of the central baffle 166 resides inside the inside margin of the top of the enclosure 170. Accordingly, the peripheral capture slot 168 overlaps the top margin of the enclosure 170 with a portion of such capture slot 168 open to the ambient air and a second portion of the capture slot 168 open to the contaminated air 120 within the enclosure 170.

Figure 6:
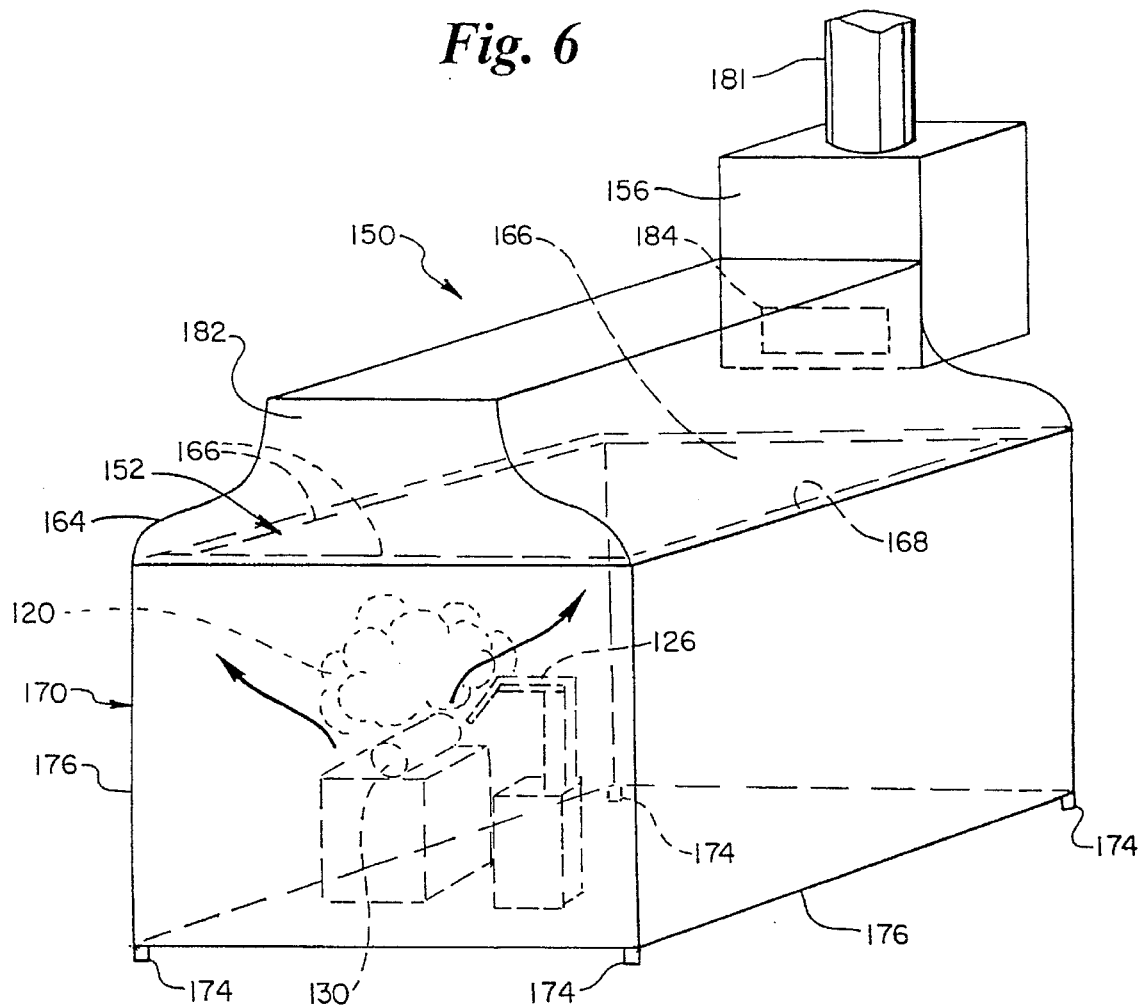

An air cleaning system 150 of the present invention that is designed to be retrofitted with a material working machine 126 that is presently installed in the factory floor is depicted in FIG. 6. In such retrofit situations, the available space in which to install the air cleaning system 150 may be severely restricted. Accordingly, it is desirable that the air cleaning system 150 be as compact as possible.

Work station enclosure 170 depicted in FIG. 6 is of the leaky type, being mounted on legs 174 and having an air passageway defined between the bottom margin of the walls 176 of the work station enclosure 170 and the floor of the factory.

The hood 164, central baffle 166, and a capture slot 168 of the source capture system 152 are configured substantially as indicated in the description of FIG. 4. A large volume plenum 182 is fluidly coupled to the hood 164. The mist/particulate separator 156 and fan with duct 158 are connected to the plenum 182. An air passageway 184 accommodates the flow of contaminated air 120 from the plenum 182 to the unit containing the mist/particulate separator 156 and fan with duct 158. An exhaust duct 181 is provided to exhaust the cleansed air from such unit.

In operation, the air cleaning system is designed to handle a vapor generated by a mechanical industrial process. For example, in a steel or aluminum mill, 500 gallons per minute of coolant is sprayed on steel or aluminum at 700° F. Such activity results in evaporation. There are two approaches to preventing cloud-like behavior of the resulting contaminated air volume. The first is to decrease the concentration and the second is to decrease the temperature thereof. A means of accomplishing both approaches is to mechanically mix the relatively warm contaminated air 120 with cooler ambient air, to break up the contaminated air cloud and decrease the temperature.

In order to break up the cloud by mixing the cooler ambient air, the peripheral capture slot 168 preferably has a long dimension extending around the full periphery of the hood 164. The second dimension of the capture slot 168 is kept relatively small, being preferably in the one to three centimeter range. By keeping this second dimension of the capture slot 168 relatively small, necessary turbulence is developed at the capture slot 168 to stir up and dissipate the cloud.

It is also desirable to provide the cooling of the cloud as close as possible to the source of contaminant. Additionally, as depicted in FIGS. 4 and 6, bringing ambient air beneath the material working machine 126 tends to stabilize the temperature of the material working machine 126, resulting in increased tool life. Preferably, the temperature of the mixed ambient air contaminated air volume 120 is less than 5° C. greater than the temperature of the ambient air.

It is important to fully contain the flow of contaminated air volume 120, such that there is an equilibrium perimeter flow through the capture slot 168. To ensure the state of the equilibrium perimeter flow, the velocity in the conduit structure 154 and the plenum 182 is approximately one half the velocity of the mixed ambient air and contaminated air volume 120 through the capture slot 168. The velocity in the capture slot is preferably in 2000 to 4000 feet per minute range. A much greater velocity requires too much fan energy to generate the flow.

In operation, the fan via duct 158 generates a negative pressure in the conduit structure 154 in the source capture system 152. This negative pressure extends throughout the length and width of the capture slot 168, resulting in the capture of the contaminated air volume 120 and the admission of a substantial volume of ambient air. The vigorous mixing of the cool ambient air with the warm cloud-like contaminated air volume 120 at the capture slot 168 causes breakup of the cloud-like contaminated air volume 120. The vapor contained within the cloud-like contaminated air volume 120 becomes a mist, which is readily handled by the mist/particulate separator 156.

Figure 8:
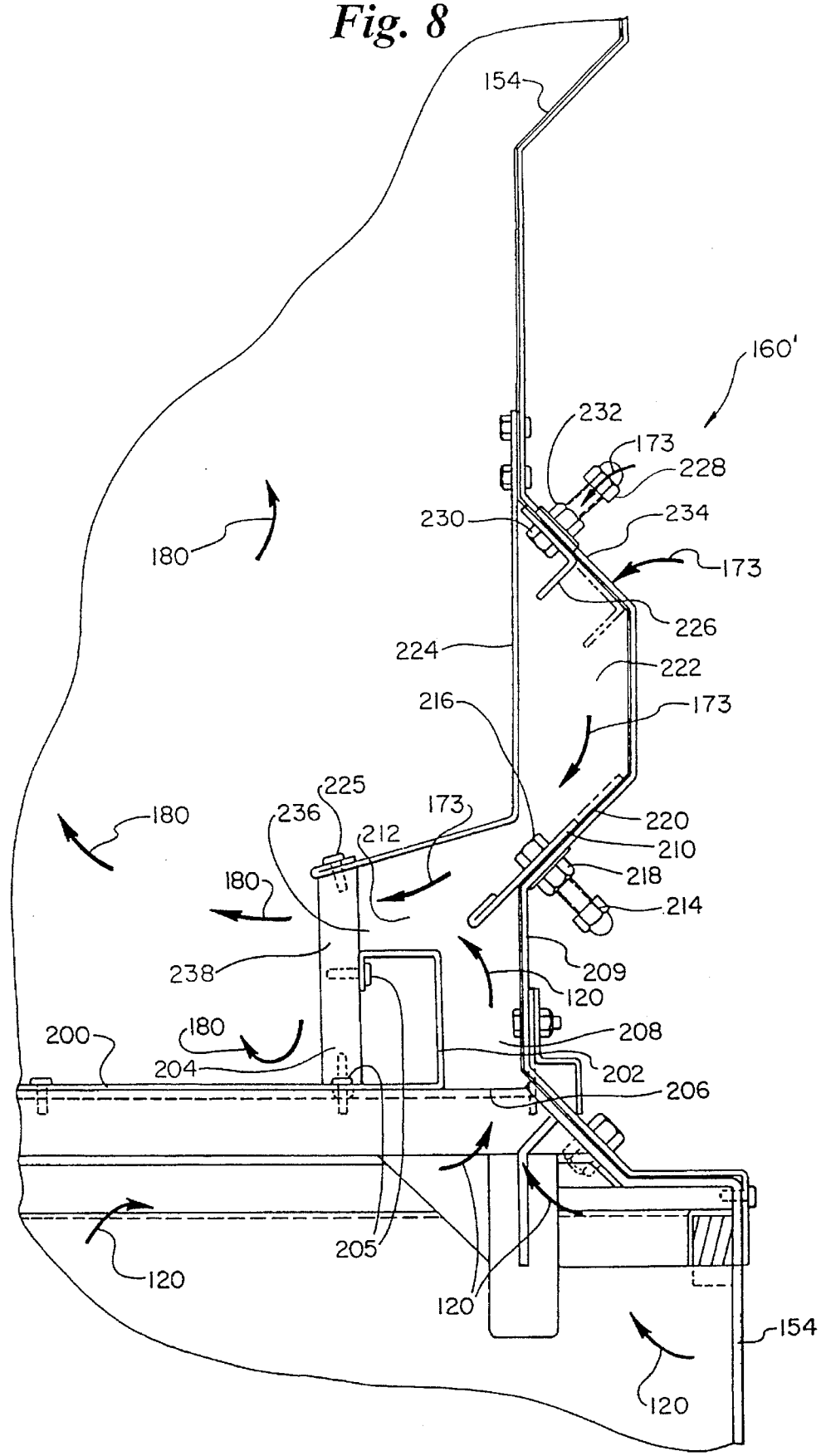

FIG. 8 depicts inline mixing structure 160' of air cleaning system 150 that is installed in conduit structure 154. Such installation may occur when a conduit structure 154 is initially constructed or it may occur by removing an existing section of conduit structure 154 and replacing such removed section with the inline mixing structure 160'.

The structure depicted in FIG. 8 is a peripheral structure that effectively forms a structure at the outer periphery of all four sides of a rectangular shaped conduit structure 154. The effect of the inline mixing structure 160' is to interpose a solid baffle restrictor plate 200 across the cross sectional dimension of conduit structure 154. The restrictor plate 200 is rectangular in shape having exterior dimensions that are slightly less than the interior dimensions of conduit structure 154. Accordingly, a peripheral contaminated air inlet 206 is defined at all four edge margins of the restrictor plate 200. The length of such peripheral contaminated air inlet 206 is substantially equal to the perimeter dimension of the restrictor plate 200. The width dimension of the peripheral contaminated air inlet 206 is substantially less, being preferably approximately 2.5 centimeters.

The restrictor plate 200 has an interior channel wall 202 defined at the periphery thereof. Interior channel wall 202 is supported by a channel wall brace 204 affixed to the restrictor plate 200 and the interior channel wall 202 by machine screws 205.

The peripheral contaminated air inlet 206 is fluidly coupled to a contaminated air channel 208 that is formed between the interior channel wall 202 and the exterior channel wall 209.

A selectively positionable inlet volume control 210 is positioned at the exit of the contaminated air channel 208 and defines a throat 212 between a margin of the inlet volume control 210 and the interior channel wall 202. The area of the throat 212 is variable by adjusting the inlet volume control 210.

The inlet volume control 210 is a plate that is affixed to the inner side of the exterior channel wall 209 by a bolt 214. The bolt 214 is driven into nut 216 that is affixed to the inlet volume control 210. A lock nut 218 is positioned from the exterior side of exterior channel wall 209 on bolt 214. The bolt 214 is mounted in a slot 220 formed in the exterior channel wall 209. Positioning bolt 214 within the slot 220 slides the inlet volume control in or out to affect the size of the throat 212.

An ambient air channel 222 is formed between the inner ambient air channel wall 224 and exterior channel wall 209. The inner ambient air channel wall 224 is supported at one end by channel wall brace 204 and is affixed thereto by machine screw 225. An inlet volume control 226 is affixed to the inner side of exterior channel wall 209. The inlet volume control 226 is positionable by bolt 228 slidingly engaged in a slot 234. The bolt 228 is held in position by the nut 230 and lock nut 232. Translation of the inlet volume control 226 within slot 234 acts to vary the exposed area of an aperture (not shown) defined in exterior channel wall 209. Such variation effectively controls the ambient air volume 173 entering the ambient air channel 222.

The contaminated air channel 208 and the ambient air channel 222 converge in a mixing channel 236. The mixing channel 236 is defined between the inner ambient air channel wall 224 and the interior channel wall 202. The mixed air volume 180 in the mixing channel 236 is exhausted through the mixed air exhaust 238 back into the conduit structure 154.

In operation, the contaminated air volume 120 impinges upon the restrictor plate 200 and is drawn to the periphery thereof by the negative pressure in the contaminated air channel 208. The contaminated air volume 120 flows through the peripheral contaminated air inlet 206 and the contaminated air channel 208.

The ambient air volume 173 enters the ambient air channel 222 through the aperture defined in the exterior channel wall 209. The ambient air volume 173 is drawn through the ambient air channel 222 by the negative pressure therein. The inlet volume control 226 is adjusted to achieve a desired mixing ratio of the ambient air volume 173 and the contaminated air volume 120 to achieve a desired mixed air volume 180.

The throat 212 is set at a desired area by adjusting the inlet volume control 210. Adjusting the area of throat 212 affects the turbulence of the contaminated air volume 120 passing therethrough. Achieving a highly agitated state of the contaminated air volume 120 at the point of intersection with the ambient air volume 173 is desirable in order to break up the cloud-like conditions of the contaminated air volume 120. Mixing of the contaminated air volume 120 and the ambient air volume 173 occurs in the mixing channel 236 and is exhausted through the mixed air exhaust 238 to continue in the form of mist to the air cleaning apparatus 156.

A method for sizing a source capture and contaminant removal system for a given industrial metal working process prior to installation and operation of the industrial process is also provided by the present invention. The source capture is as previously described. The method comprises the steps of: (a) determining a maximum dissipated heat energy of the industrial process based upon a horsepower output of any motors used by the industrial process; (b) if a liquid coolant is used in the industrial process, determining a characteristic type and a maximum liquid coolant pressure for the liquid coolant; (c) if the source capture system is at least partially open to ambient air between the industrial process and the source capture system, determining a maximum terminal velocity of the ambient air surrounding the source capture system; (d) using the maximum dissipated energy, the characteristic type and the maximum liquid coolant pressure of the liquid coolant, and the maximum terminal velocity to establish a minimum air flow velocity of air entering the source capture system; and (e) selecting an effective cross-sectional size of the opening of the source capture system to provide the minimum air flow velocity of air entering the source capture system based on the given air velocity volume in the conduit structure.

I claim:

1. A source capture system for capturing contaminated air from an industrial process comprising:

capture means for continuously capturing a contaminated air volume having a mist/vapor component that is emitted during operation of the industrial process, the capture means having a structure with a capture opening oriented toward a source of the contaminated air volume within the industrial process; and mixing means operably coupled to the capture means for mixing the contaminated air volume with an ambient air volume to produce a mixed air volume in which the mist/vapor component of the mixed air volume is generally prevented from exhibiting aerosol bulk motion characteristics of a cloud, said mixing means effecting a reduction in temperature in said contaminated air volume and inducing a turbulent condition therein promoting a reduced concentration thereof in combination with said ambient air volume.

2. The source capture system of claim 1 wherein the mixing means comprises structure operably positioned between the capture opening and the source of the contaminated air volume and defining one or more static openings, each of the static openings having at least one static opening dimension which is small enough to prevent a cloud having bulk motion aerosol characteristics from passing through the static opening intact at a given mixing velocity.

3. A source capture system for capturing contaminated air from an industrial process comprising:

capture means for continuously capturing a contaminated air volume having a mist/vapor component that is emitted during operation of the industrial process, the capture means having a structure with a capture opening oriented toward a source of the contaminated air volume within the industrial process; and mixing means operably coupled to the capture means for mixing the contaminated air volume with an ambient air volume to produce a mixed air volume in which the mist/vapor component of the mixed air volume is generally prevented from exhibiting aerosol bulk motion characteristics of a cloud, the mixing means having structure operably positioned between the capture opening and the source of the contaminated air volume and defining one or more static openings, each of the static openings having at least one static opening dimension being smaller than about 2.5 centimeters.

4. The source capture system of claim 2 wherein the at least one static opening dimension of each of the static openings having is sized such that the mixing velocity is between about 2.5 and 25.0 meters per second.

5. The source capture system of claim 2 wherein the structure of the capture means is a hood arrangement having a hood opening with a cross-sectional area that is proportionally larger than a cross-sectional area of the source of the contaminated air volume in relation to a height of the hood opening above the source and the structure of the mixing means is positioned within the hood opening.

6. The source capture system of claim 5 wherein the static openings are located around at least a portion of a perimeter of the hood opening.

7. The source capture system of claim 6 wherein the static openings are comprised of narrow slots having an opening width less than the at least one dimension and located around the perimeter of the hood opening.

8. The source capture system of claim 2 wherein the structure of the capture means is a containment unit that generally surrounds the industrial process and has at least three side wall structures and a top wall structure with the capture opening defined in the top wall structure, and wherein the structure of the mixing means is positioned below the top wall and one or more ambient openings are provided in the containment unit for admitting the ambient air volume into the containment unit.

9. The source capture system of claim 8 wherein the static openings are located around at least a portion of a perimeter of the top wall.

10. The source capture system of claim 9 wherein the static openings are comprised of narrow slots having an opening width less than the at least one dimension and located around the perimeter of the top wall.

11. The source capture system of claim 8 wherein the one or more ambient openings are located near the bottom of the containment unit and below the source of the contaminated air volume.

12. The source capture system of claim 8 wherein the one or more ambient openings are located near the top wall structure of the containment unit adjacent the structure of the mixing means.

13. A source capture system for capturing contaminated air from an industrial process comprising:

capture means for continuously capturing a contaminated air volume having a mist/vapor component that is emitted during operation of the industrial process, the capture means having a structure with a capture opening oriented toward a source of the contaminated air volume within the industrial process, the structure of the capture means being a containment unit that generally surrounds the industrial process and has at least three side wall structures and a top wall structure with the capture opening defined in the top wall structure, and wherein the structure of the mixing means is positioned below the top wall and one or more ambient openings are provided in the containment unit for admitting the ambient air volume into the containment unit, the one or more ambient openings being located near the top wall structure of the containment unit adjacent the structure of the mixing means, wherein the one or more ambient openings are selectably variable in cross-sectional area so as to selectively control the ambient air volume; and mixing means operably coupled to the capture means for mixing the contaminated air volume with an ambient air volume to produce a mixed air volume in which the mist/vapor component of the mixed air volume is generally prevented from exhibiting aerosol bulk motion characteristics of a cloud, the mixing means having structure operably positioned between the capture opening and the source of the contaminated air volume and defining one or more static openings, each of the static openings having at least one static opening dimension which is small enough to prevent a bulk motion aerosol having the bulk motion characteristics of a cloud from passing through the static opening intact at a given mixing velocity.

14. The source capture system of claim 1 being operably coupled to a mist removal apparatus, wherein the source capture system further comprises:

conduit structure for operably connecting the opening of the capture means to a contaminate removal apparatus; and means for drawing the mixed air volume from the opening through the conduit structure to the mist removal apparatus at a given air volume velocity, the conduit structure and the means for drawing being arranged so as to provide for an average residence time of the mixed air volume when drawn through the conduit means at the given air volume velocity that is greater than an average particulate condensation time of the mist/vapor component of the mixed air volume.

15. The source capture system of claim 14 wherein the at least one static opening dimension of each of the static openings having is sized such that the mixing velocity is between about 2.5 and 25.0 meters per second.

16. The source capture system of claim 14 wherein the mixing means comprises structure operably positioned between the capture opening and the source of the contaminated air volume and defining one or more static openings, each of the static openings having at least one static opening dimension which is small enough to prevent a bulk motion aerosol having the bulk motion characteristics of a cloud from passing through the static opening intact at a velocity that is at least about twice the given air volume velocity.

17. An apparatus for receiving contaminated air preparatory to treatment of the contaminated air, the mechanism comprising:

a contaminated air receiving portion for receiving contaminated air generated by the air-contaminating process;

an ambient air receiving portion operably coupled with the contaminated air receiving portion to receive ambient air from a location other than a location of the air-contaminating process; and a mixing and turbulence-inducing portion coupled with the contaminated air receiving portion and the ambient air receiving portion to add ambient air to the contaminated air to form a mixed air volume, and to induce turbulence in at least the contaminated air received by the contaminated air receiving portion and to reduce the temperature of said contaminated air to eliminate bulk motion characteristics of a cloud of the contaminated air volume.

18. The apparatus of claim 17, wherein:

the contaminated air receiving portion comprises a first channel for receiving contaminated air;

the ambient air receiving portion comprises a second channel, distinct from the first channel, for receiving ambient air; and the mixing and turbulence-inducing portion comprises a third channel for receiving contaminated air from the first channel and ambient air from the second channel.

19. The apparatus of claim 18, wherein the mixing and turbulence-inducing portion comprises structure defining a slot through which the contaminated air passes.

20. The apparatus of claim 19, wherein the mixing and turbulence-inducing portion further comprises a slot size adjustment mechanism coupled with the structure defining the slot to selectively adjust the cross-sectional area of the slot.

21. The apparatus of claim 19, wherein the slot has a width dimension of between one and three centimeters.

22. The apparatus of claim 17, wherein the contaminated air receiving portion, the ambient air receiving portion and the mixing and turbulence-inducing portion together comprise structure defining at least one slot through which both ambient air and contaminated air flow.

23. The apparatus of claim 22, wherein the structure defining the at least one slot comprises a baffle past which the contaminated air flows.

24. The apparatus of claim 23, wherein the structure defining the at least one slot further comprises a hood that surrounds the baffle, the at least one slot being defined between the hood and the baffle.

25. A capture apparatus for capturing contaminated air generated by an industrial process preparatory to treatment of the contaminated air, the capture mechanism comprising:

means for capturing a contaminated air volume generated by the industrial process, the means for capturing a contaminated air volume defining at least one opening through which the contaminated air passes;

means for capturing an ambient air volume from a location different that the location of the industrial process; and means for mixing the contaminated air volume and the ambient air volume together at a mixing velocity of between about 2.5 and 25.0 cubic meters per second to form a mixed air volume, the mixed air volume having a ratio of ambient air to contaminated air of between about 5:1 and 100:1.

26. The apparatus of claim 25, wherein the at least one opening has a width dimension of between about one and three centimeters.

27. The apparatus of claim 25, wherein the at least one opening has at least one dimension affecting the rate of airflow therethrough such that the contaminated air passes through the at least one opening at a rate of between about 2000 and 4000 feet per minute.

28. The apparatus of claim 25, wherein the means for capturing the contaminated air volume, the means for capturing the ambient air volume, and the means for mixing the contaminated air volume and the ambient air volume comprise structure defining a slot through which the contaminated air volume and the ambient air volume pass to form the mixed air volume.

29. The apparatus of claim 28, further comprising conduit means for receiving the mixed air volume, the mixed air volume passing through the conduit means at a rate that is about one half the rate at which the contaminated air volume and ambient air volume pass through the slot.

30. An air capture system, comprising:

means for receiving a contaminated air volume that includes a vapor pressure/temperature zone conducive to developing cloud-like bulk motion characteristics at the means for receiving;

mixing means, operably coupled with the means for receiving, for mixing the contaminated air volume with an ambient air volume to form a mixed air volume, the mixing means being constructed to generally dissipate any bulk motion characteristics of the cloud of the contaminated air volume, said mixing means effecting a reduction in temperature in said contaminated air volume and inducing a turbulent condition therein promoting a reduced concentration thereof in combination with said ambient air volume.

31. The air capture system of claim 30, wherein the mixing means mixes the contaminated air volume and the ambient air volume such that the mixed air volume has a ratio of ambient air to contaminated air of between about 5:1 and 100:1.

32. The air capture system of claim 30, wherein the mixing means comprises means for generating turbulence in at least the contaminated air volume to dissipate any bulk motion characteristics of the cloud of the contaminated air volume.

* * * * *

UNITED STATES PATENT AND TRADEMARK OFFICE
CERTIFICATE OF CORRECTION

PATENT NO. : 5,622,538
DATED : April 22, 1997
INVENTOR(S) : Diachuk

It is certified that error appears in the above-indentified patent and that said Letters Patent is hereby corrected as shown below:

Cover page, column 2, line 12, delete "William C. Hienz" and substitute therefor --William C. Hinds--.

Column 1, line 31, delete "process" and substitute therefor --processes--.

Column 2, line 12, delete "type" and substitute therefor --types--.

Column 2, line 41, delete "system" and substitute therefor --systems--.

Column 5, line 32, delete "have" and substitute therefor --having--.

Column 7, line 43, delete "as a being " and substitute therefor --as being--.

UNITED STATES PATENT AND TRADEMARK OFFICE
CERTIFICATE OF CORRECTION

PATENT NO. : 5,622,538
DATED : April 22, 1997
INVENTOR(S) : Diachuk

It is certified that error appears in the above-indentified patent and that said Letters Patent is hereby corrected as shown below:

Column 11, line 28, delete "having is sized" and substitute therefor --is sized--.

Column 12, line 54, delete "having is sized" and substitute therefor --is sized--.

Column 14, line 2, delete "that" and substitute therefor --from--.

Signed and Sealed this

Twenty-fifth Day of November, 1997

Attest:

BRUCE LEHMAN

Attesting Officer

Commissioner of Patents and Trademarks